(12) United States Patent  
Nomura et al.

(10) Patent No.: US 8,009,361 B2  
(45) Date of Patent: Aug. 30, 2011

(54) LENS ARRAY AND LINE HEAD

(75) Inventors: Yujiro Nomura, Shiojiri (JP); Ken Ikuma, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 21 days.

(21) Appl. No.: 12/544,108

(22) Filed: Aug. 19, 2009

(65) Prior Publication Data

US 2010/0046080 A1 Feb. 25, 2010

(30) Foreign Application Priority Data

Aug. 19, 2008 (JP) ................ 2008-210359

(51) Int. Cl.
*G02B 27/10* (2006.01)
*B41J 2/45* (2006.01)
*G03G 15/14* (2006.01)

(52) U.S. Cl. ........ 359/619; 359/621; 359/622; 359/626; 359/455; 359/456; 347/238; 347/241; 347/244; 399/218; 399/51; 399/221

(58) Field of Classification Search .......... 359/619–626, 359/628, 455, 456, 460; 362/97.3, 97.4, 362/240; 399/218; 438/29, 69, 71; 257/88, 432; 216/52

See application file for complete search history.

(56) References Cited

U.S. PATENT DOCUMENTS

| | | | | |
|---|---|---|---|---|
| 6,638,786 B2* | 10/2003 | Yamamoto | ................ | 438/57 |
| 6,693,748 B1* | 2/2004 | Fujimoto et al. | ............. | 359/621 |
| 6,700,316 B2* | 3/2004 | Taniuchi et al. | ............. | 313/111 |
| 7,092,166 B1* | 8/2006 | Wood | ............ | 359/626 |
| 7,113,333 B2* | 9/2006 | Kamijima | ............ | 359/456 |
| 7,538,942 B2* | 5/2009 | Odagiri et al. | ............. | 359/455 |
| 7,612,943 B2* | 11/2009 | Ono et al. | ............ | 359/618 |
| 7,656,453 B2* | 2/2010 | Nishi | ............ | 348/340 |
| 7,766,509 B1* | 8/2010 | Laporte | ............ | 362/249.02 |
| 2008/0030566 A1 | 2/2008 | Nomura et al. | ............ | 347/130 |

FOREIGN PATENT DOCUMENTS

| | | |
|---|---|---|
| JP | 2002-122706 | 4/2002 |
| JP | 2005-276849 | 10/2005 |
| JP | 2008-036937 | 2/2008 |

* cited by examiner

*Primary Examiner* — Loha Ben
(74) *Attorney, Agent, or Firm* — DLA Piper LLP (US)

(57) ABSTRACT

A lens array includes: a lens array substrate having a light transmissive property; a first lens disposed on the lens array substrate; and a second lens disposed on the lens array substrate in a first direction from the first lens and different from the first lens in peripheral shape.

6 Claims, 8 Drawing Sheets

LENS ARRAY AND LINE HEAD

BACKGROUND

1. Technical Field

The present invention relates to a lens array with lenses arranged and a line head using the lens array.

2. Related Art

A line head for forming a latent image on a scanned surface of a photoconductor as a latent image carrier by scanning a light beam thereon is used, for example, as a light source of an electrophotographic printer as an image forming apparatus. An optical print head as the line head is provided with a head substrate mounting a plurality of light emitting element groups, and a lens array having lenses corresponding to the light emitting element groups. As a method of manufacturing a lens array, there are known a method (see, e.g., JP-A-2005-276849 (pages 7 and 8, FIGS. 9 through 13)) of forming a mold using photolithography and electrocasting and then forming lenses on a glass substrate with light curing resin, a method (see, e.g., JP-A-2002-122706 (page 6, FIGS. 6 and 7)) of bonding a resin film provided with lenses on a glass substrate, and soon. Further, as a technology for a line head, there is provided a technology (see, e.g., JP-A-2008-36937 (pages 13 and 14, FIG. 12)) of using a lens array having lenses arranged two-dimensionally to image a plurality of light emitting elements corresponding to each of the lenses However, in the lens array used, for example, in an optical print head, since a number of lenses are arranged in the main-scanning direction, it is difficult to identify the position of a specific lens in the arrangement of the lane array among these lenses, in some cases. For example, when performing an inspection of checking whether or not the lenses have any blot or blemish in the manufacturing process of the lens array, there is a possibility of causing a problem that it is difficult to identify the position of the lens in the arrangement accurately and in a short period of time in response to detection of a defective lens.

SUMMARY

An advantage of some aspects of the invention is to solve at least a part of the problem described above, and the invention can be realized as the following embodiment or aspects.

According to a first aspect of the invention, there is provided a lens array including a lens array substrate having a light transmissive property, a first lens disposed on the lens array substrate, and a second lens disposed on the lens array substrate in a first direction from the first lens and different from the first lens in peripheral shape.

According to this aspect of the invention, since the peripheral shape of the second lens disposed on the lens array substrate in the first direction is different from the peripheral shape of the first lens, the positions of the lenses in the arrangement in the first direction can be sectioned based on the difference of the peripheral shape of the second lens. Therefore, with respect to a specific lens among the lenses, the position in the arrangement of the lens array can be indicated using the position of the second lens with the different peripheral shape in the arrangement as an index, and it becomes easy to identify the position in the arrangement.

Further, for example, in the case in which an inspection for checking whether or not the lenses have any blot or blemish is performed in the manufacturing process of the lens array, it becomes easy to identify the position of the lens in the arrangement, which is detected as a defective lens, accurately and in a short period of time using the position of the second lens with the different peripheral shape in the arrangement as an index.

According to a second aspect of the invention, in the lens array described above, a plurality of lenses including the first lens and the second lens is disposed two-dimensionally in the first direction and a second direction one of perpendicular to and substantially perpendicular to the first direction.

This aspect of the invention can be applied to the lens array provided with a large number of lenses arranged in a plurality of rows of lenses along the first direction.

According to a third aspect of the invention, in the lens array described above, a part in which the peripheral shape of the second lens is different from the peripheral shape of the first lens is formed in an area outside an effective range of the second lens. According to this aspect of the invention, since the part in which the peripheral shape is different is formed in the areas outside the effective range of the lens, the part in which the peripheral shape is different can be prevented from affecting the optical characteristic of the lens.

According to a fourth aspect of the invention, in the lens array described above, the peripheral shape of the second lens is a D-cut shape.

According to this aspect of the invention, since the peripheral shape of the lens is the D-cut shape, the shape can easily be formed without requiring any complicated work.

According to a fifth aspect of the invention, in the lens array described above, the second lens is provided to the lens array substrate at each of positions disposed in the first direction with one of constant and substantially constant intervals.

According to this aspect of the invention, since the positions of the lenses in the arrangement thereof in the first direction can be indicated using the order of the second lenses formed in the first direction with constant or substantially constant intervals, it becomes easy to identify the positions of the lenses in the arrangement.

According to a sixth aspect of the invention, there is provided a line head including the lens array described above, and a head substrate having a plurality of light emitting elements arranged and adapted to emit light to be imaged by the lenses.

According to this aspect of the invention, the line head capable of achieving the advantage described above can be obtained.

BRIEF DESCRIPTION OF THE DRAWINGS

The invention will now be described with reference to the accompanying drawings, wherein like numbers reference like elements.

DESCRIPTION OF AN EXEMPLARY EMBODIMENT

An embodiment of the invention and some modified examples thereof will hereinafter be explained with reference to the accompanying drawings.

Figure 1:
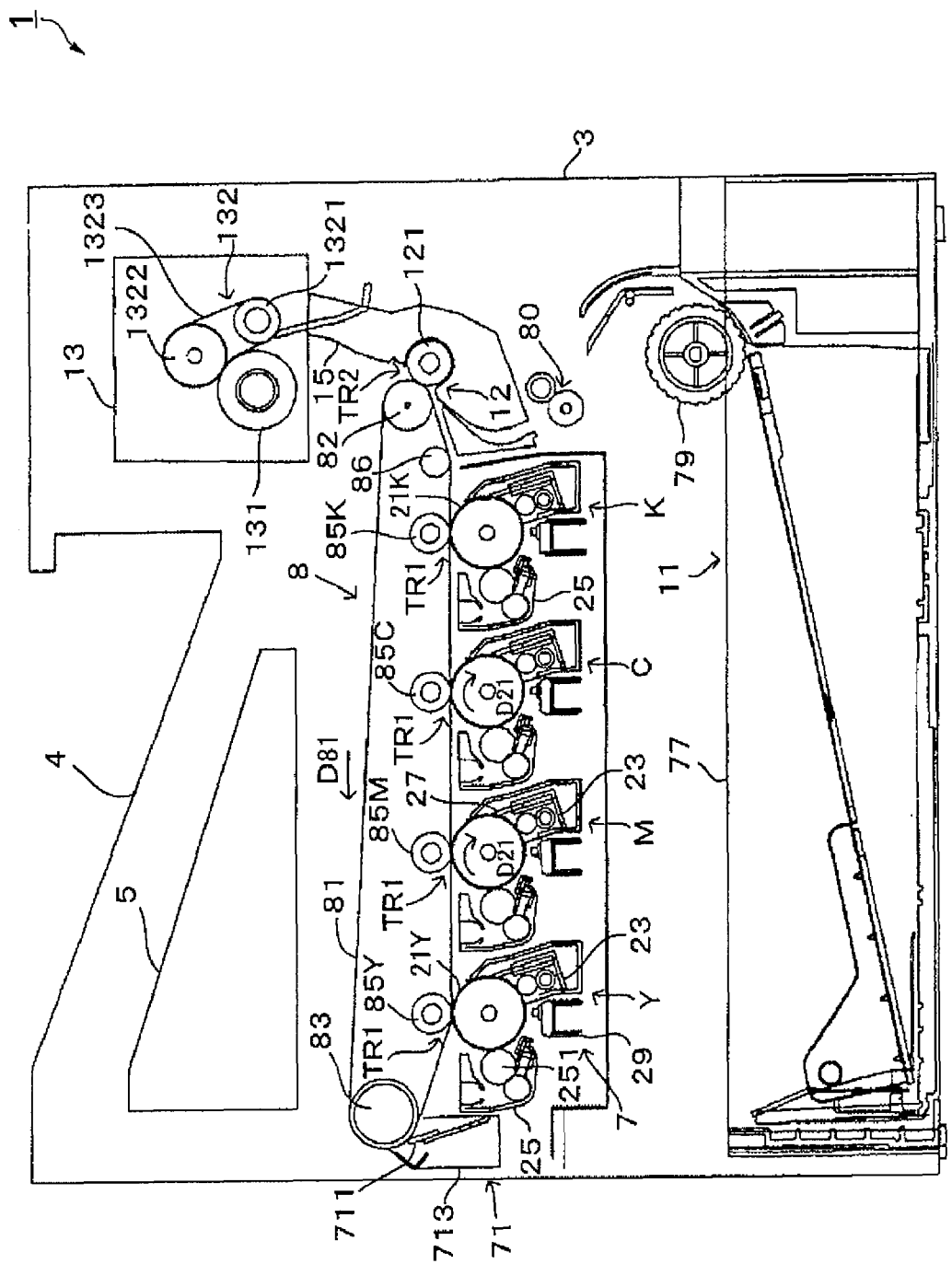
FIG. 1 is a diagram showing an image forming apparatus as an embodiment of the invention.
Figure 2:
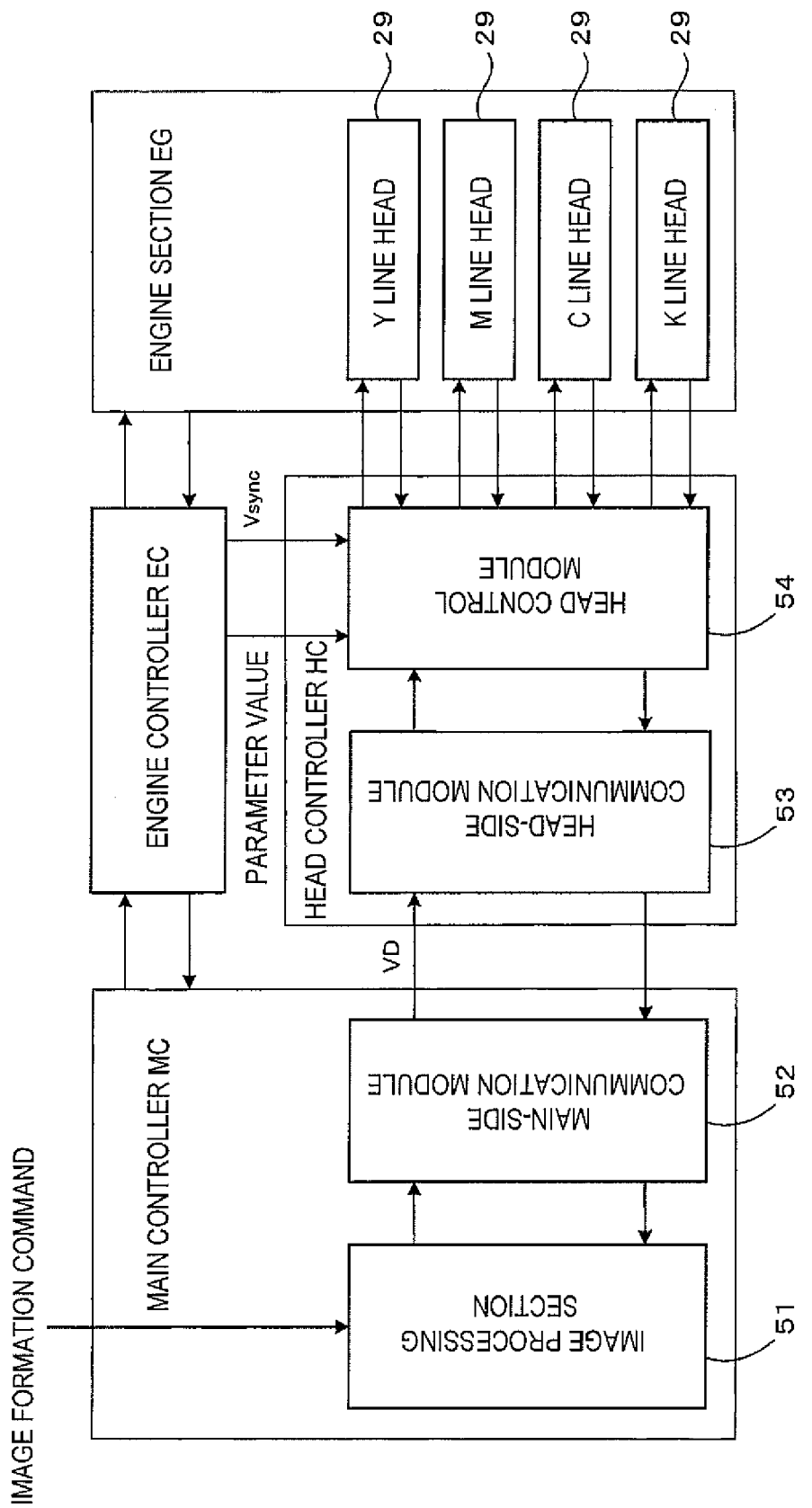
FIG. 2 is a diagram showing an electrical configuration of the image forming apparatus.

FIG. 1 is a diagram showing an image forming apparatus 1 as an embodiment of the invention. FIG. 2 is a diagram showing an electrical configuration of the image forming apparatus 1 shown in FIG. 1.

The image forming apparatus 1 is capable of selectively operating in a color mode in which a color image is formed by overlapping four colors of toners of black (K), cyan (C), magenta (M), and yellow (Y), and in a monochrome mode in which a monochrome image is formed using only the black (K) toner.

In the image forming apparatus 1, when an image formation command is provided to a main controller MC having a CPU, a memory, and so on from an external apparatus such as a host computer, the main controller MC provides an engine controller EC with a control signal and so on, and a head controller HC with video data VD corresponding to the image formation command. Further, the head controller HC controls line heads 29 for respective colors based on the video data VD from the main controller MC, and a vertical sync signal Vsync and parameter values from the engine controller EC. Thus, an engine section EG performs a prescribed image forming operation, thereby forming an image corresponding to the image formation command on copy paper, transfer paper, a form, an OHP transparent sheet, and so on.

Inside a main housing 3 provided to the image forming apparatus 1, there is disposed an electric component box 5 incorporating a power supply circuit board (not shown), the main controller MC, the engine controller EC, and the head controller HC. Further, an image forming unit 7, a transfer belt unit 8, and a paper feed unit 11 are also disposed inside the main housing 3. Further, inside the main housing 3 and on the right side thereof in FIG. 1, there are disposed a secondary transfer unit 12, a fixing unit 13, a sheet guide member 15, and so on. It should be noted that the paper feed unit 11 is configured so as to be detachably attached to the main housing 3. Further, it is arranged that the paper feed unit 11 and the transfer belt unit 8 can separately be detached therefrom to be repaired or replaced.

The image forming unit 7 is provided with four image forming stations Y (for yellow), M (for magenta), C (for cyan), and K (for black) for forming images with a plurality of colors different from each other. Further, each of the image forming stations Y, M, C, and K is provided with a photoconductor drum 21 having a surface on which a toner image of the corresponding color is formed. Each of the photoconductor drums 21 is connected to a dedicated drive motor, and is driven to rotate at a predetermined speed in a rotational direction D21. Thus, it is arranged that the surface of each of the photoconductor drums 21 is fed in the sub-scanning direction. Further, around each of the photoconductor drums 21, there are disposed along the rotational direction, a charging section 23, the line head 29, a developing section 25, and a photoconductor cleaner 27. Further, charging operation, latent image forming operation, and toner developing operation are executed by these functional sections. Therefore, when operating in the color mode, the toner images respectively formed in all of the image forming stations Y, M, C, and K are overlapped on a transfer belt 81 provided to the transfer belt unit 8, thereby forming a color image. Further, when operating in the monochrome mode, a monochrome image is formed using only the toner image formed in the image forming station K. It should be noted that in FIG. 1, since the image forming stations in the image forming unit 7 have the same configurations as each other, the reference numerals are only provided to some of the image forming stations, and are omitted in the rest of the image forming stations only for the sake of convenience of illustration.

The charging section 23 is provided with a charging roller having a surface made of elastic rubber. The charging roller is configured so as to be rotated by the contact with the surface of the photoconductor drum 21 at a charging position, and is rotated in association with the rotational operation of the photoconductor drum 21 in a driven direction with respect to the photoconductor drum 21 at a circumferential velocity. Further, the charging roller is connected to a charging bias generating section (not shown), accepts the power supply for the charging bias from the charging bias generating section, and charges the surface of the photoconductor drum 21 at the charging position where the charging section 23 and the photoconductor drum 21 have contact with each other.

The line head 29 is provided with a plurality of light emitting elements arranged in an axial direction (a direction perpendicular to the sheet of FIG. 1) of the photoconductor drum 21, and is disposed apart from the photoconductor drum 21. Further, the light emitting elements emit light onto the surface of the photoconductor drum 21 charged by the charging section 23 to form the latent image.

It should be noted that in the present embodiment, the head controller HC is provided for controlling the line heads 29 for respective colors, and controls each of the line heads 29 based on the video data VD from the main controller MC and the signals from the engine controller EC. Specifically, in the present embodiment, the image data included in the image formation instruction is input to an image processing section 51 of the main controller MC. Then, various kinds of image processing are executed on the image data to generate the video data VD for the respective colors, and the video data VD is provided to the head controller HC via a main-side communication module 52. Further, in the head controller HC, the video data VD is provided to a head control module 54 via a head-side communication module 53.

To the head control module 54, the signal representing the parameter value related to latent image formation and the vertical sync signal Vsync are provided from the engine controller EC, as described above. Then, the head controller HC generates signals to the line heads 29 of the respective colors for controlling driving of the elements based on the signal described above, the video data VD, and so on, and then outputs the signals to the respective line heads 29. In this way, the operations of the light emitting elements are appropriately controlled in each of the line heads 29, and thus the latent images corresponding to the image formation instruction are formed.

Further, in the present embodiment, the photoconductor drum 21, the charging section 23, the developing section 25, and the photoconductor cleaner 27 of each of the image forming stations Y, M, C, and K are unitized as a photoconductor cartridge. Further, each of the photoconductor cartridges is provided with a nonvolatile memory for storing information related to the photoconductor cartridge. Further, wireless communication is performed between the engine controller EC and each of the photoconductor cartridges. Thus, the information related to each of the photoconductor cartridges is transmitted to the engine controller EC, and the information in each of the memory devices is stored as an update.

The developing section 25 has a developing roller 251 with a surface holding the toner. Further, the charged toner is moved from the developing roller 251 to the photoconductor drum 21 by a developing bias, which is applied to the developing roller 251 from a developing bias generating section (not shown), at the developing position where the developing roller 251 and the photoconductor drum 21 have contact with each other, thereby making the electrostatic latent image formed by the line head 29 visible.

The toner image thus made visible at the developing position described above is fed in the rotational direction D21 of the photoconductor drum 21, and then primary-transferred to the transfer belt 81 at a primary transfer position TR1 at which the transfer belt 81 and each of the photoconductor drums 21 have contact with each other.

Further, in the present embodiment, the photoconductor cleaner 27 is disposed downstream of the primary transfer position TR1 and upstream of the charging section 23 in the rotational direction D21 of the photoconductor drum 21 so as to have contact with the surface of the photoconductor drum 21. The photoconductor cleaner 27 removes the toner remaining on the surface of the photoconductor drum 21 after the primary transfer to clean the surface thereof by having contact with the surface of the photoconductor drum 21.

The transfer belt unit 8 is provided with a drive roller 82, a driven roller 83 (hereinafter also referred to as a blade-opposed roller) disposed on the left of the drive roller 82, and the transfer belt 81 stretched across these rollers and circularly driven in the direction (a feeding direction) of an arrow D81 shown in the drawing. Further, the transfer belt unit 8 is provided with four primary transfer rollers 85Y, 85M, 85C, and 85K disposed inside the transfer belt 81 respectively opposed one-to-one to the respective photoconductor drums 21 included in the image forming stations Y, M, C, and K when the photoconductor cartridges are mounted. These primary transfer rollers 85 are electrically connected separately to the primary transfer bias generating section (not shown). Further, when operating in the color mode, all of the primary transfer rollers 85Y, 85M, 85C, and 85K are positioned on the side of the image forming stations Y, M, C, and K as shown in FIG. 1 to press the transfer belt 81 against the photoconductor drums 21 included in the respective image forming stations Y, M, C, and K, thereby forming the primary transfer position TR1 between each of the photoconductor drums 21 and the transfer belt 81. Then, by applying the primary transfer bias to the primary transfer rollers 85 from the primary transfer bias generating section at appropriate timing, the toner images formed on the surfaces of the photoconductor drums 21 are transferred to the surface of the transfer belt 81 at the respective primary transfer positions TR1 to form a color image.

On the other hand, when operating in the monochrome mode, the primary transfer rollers 85Y, 85M, and 85C for color printing out of the four primary transfer rollers 85 are separated from the image forming stations Y, M, and C respectively opposed thereto, while only the primary transfer roller 85K mainly for monochrome printing is pressed against the image forming station K, thereby making only the image forming station K mainly for monochrome printing have contact with the transfer belt 81. As a result, the primary transfer position TR1 is formed only between the primary transfer roller 85K mainly for monochrome printing and the corresponding image forming station K. Then, by applying the primary transfer bias to the primary transfer roller 85K mainly for monochrome printing from the primary transfer bias generating section at appropriate timing, the toner image formed on the surface of the photoconductor drum 21 is transferred to the surface of the transfer belt 81 at the primary transfer position TR1, thereby forming a monochrome image.

Further, the transfer belt unit 8 is provided with a downstream guide roller 86 disposed on the downstream side of the primary transfer roller 85K mainly for monochrome printing and on the upstream side of the drive roller 82. Further, the downstream guide roller 86 is arranged to have contact with the transfer belt 81 on a common internal tangent of the primary transfer roller 85K mainly for monochrome printing and the photoconductor drum 21 at the primary transfer position TR1 formed by the primary transfer roller 85K mainly for monochrome printing having contact with the photoconductor drum 21 of the image forming station K.

The drive roller 82 circularly drives the transfer belt 81 in the direction of the arrow D81 shown in the drawing, and at the same time functions as a backup roller for a secondary transfer roller 121. On the peripheral surface of the drive roller 82, there is formed a rubber layer with a thickness of about 3 mm and a volume resistivity of no greater than 1000 kΩ·cm, which is grounded via a metal shaft to serve as a conducting path for a secondary transfer bias supplied from a secondary transfer bias generating section (not shown) via the secondary transfer roller 121. By thus providing the rubber layer having a high frictional property and a shock absorbing property to the drive roller 82, the impact caused by a sheet entering the contact section (a secondary transfer position TR2) between the drive roller 82 and the secondary transfer roller 121 is hardly transmitted to the transfer belt 81, thus the degradation of the image quality can be prevented The paper feed unit 11 is provided with a paper feed section including a paper feed cassette 77 capable of holding a stack of sheets, and a pickup roller 79 for feeding the sheet one-by-one from the paper feed cassette 77. The sheet fed by the pickup roller 79 from the paper feed section is fed to the secondary transfer position TR2 along the sheet guide member 15 after the feed timing thereof is adjusted by a pair of resist rollers 80.

The secondary transfer roller 121 is provided so as to be able to be selectively contacted with and separated from the transfer belt 81, and is driven to be selectively contacted with and separated from the transfer belt 81 by a secondary transfer roller drive mechanism (not shown). The fixing unit 13 has a heating roller 131, which is rotatable and incorporates a heater such as a halogen heater, and a pressing section 132 for biasing the heating roller 131 to be pressed against an object. Then, the sheet with the image, which is secondary-transferred on the surface thereof, is guided by the sheet guide member 15 to a nipping section formed of the heating roller 131 and a pressing belt 1323 of the pressing section 132, and the image is thermally fixed in the nipping section at predetermined temperature. The pressing section 132 is composed of two rollers 1321, 1322 and the pressing belt 1323 stretched across the two rollers. Further, it is arranged that by pressing a tensioned part of the surface of the pressing belt 1323, which is stretched by the two rollers 1321, 1322, against the peripheral surface of the heating roller 131, a large nipping section can be formed between the heating roller 131 and the pressing belt 1323. Further, the sheet on which the fixing process is thus executed is fed to a paper catch tray 4 disposed on an upper surface of the main housing 3.

Further, in the present apparatus, a cleaner section 71 is disposed facing the blade-opposed roller 83. The cleaner section 71 has a cleaner blade 711 and a waste toner box 713. The cleaner blade 711 removes foreign matters such as the toner or paper dust remaining on the transfer belt 81 after the secondary transfer process by pressing a tip section thereof against the blade-opposed roller 83 via the transfer belt 81. Then the foreign matters thus removed are collected into the waste toner box 713. Further, the cleaner blade 711 and the waste toner box 713 are configured integrally with the blade-opposed roller 83. Therefore, when the blade-opposed roller 83 moves, the cleaner blade 711 and the waste toner box 713 should also move together with the blade-opposed roller 83.

Figure 3:
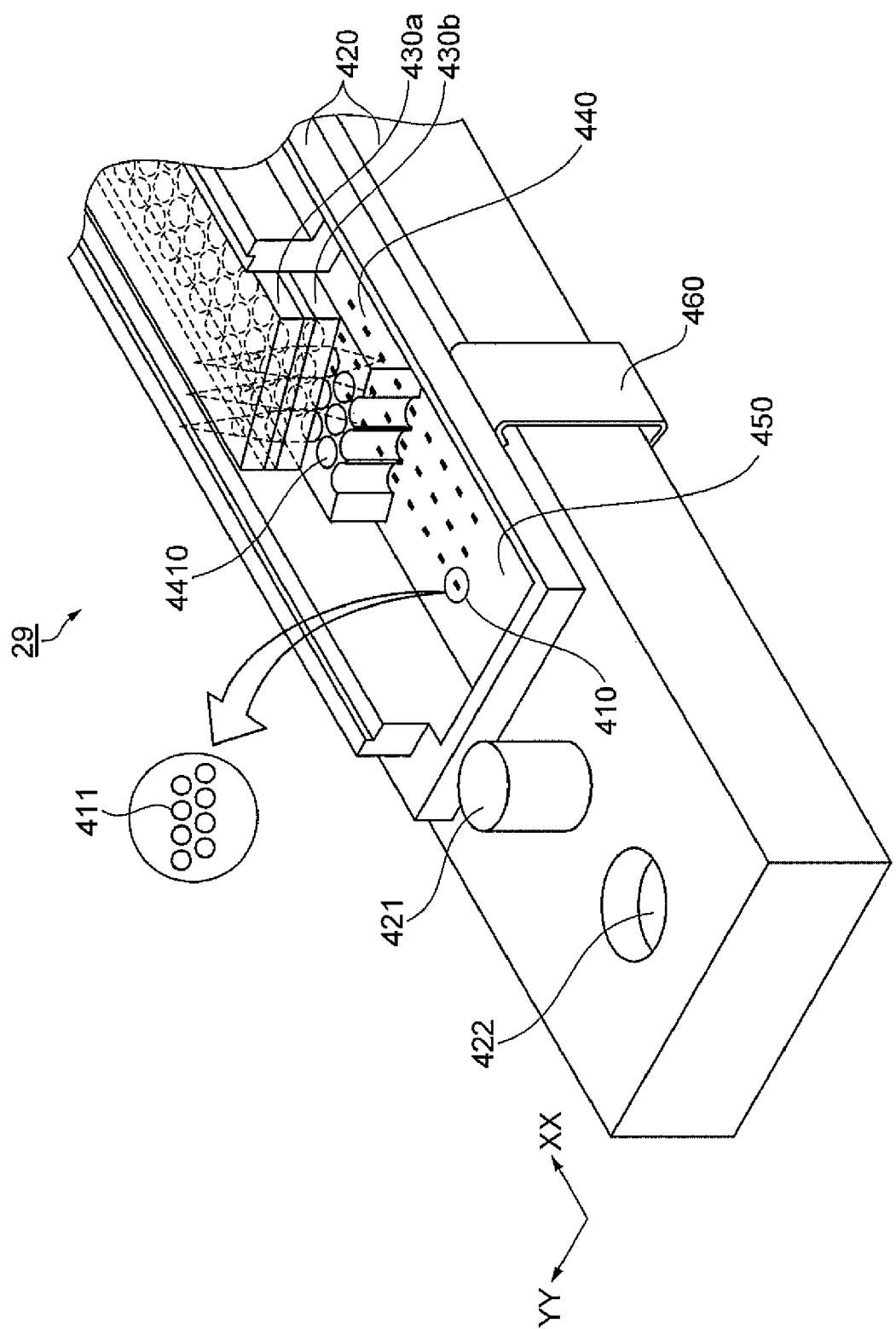
FIG. 3 is a schematic perspective view of a line head.

Then, the line head 29 in the present embodiment will be explained in detail based on the drawings. FIG. 3 is a schematic perspective view of the line head 29 according to the present embodiment. Further, FIG. 4 is a cross-sectional view of the line head 29 cut along a sub-scanning direction YY.

In FIG. 3, the line head 29 is provided with light emitting element groups 410 arranged in a main-scanning direction XX as a first direction. Each of the light emitting element groups 410 is provided with a plurality of light emitting elements 411. As shown in FIG. 4, the light emitting elements 411 emit light to a surface 200 as a scanned surface of a photoconductor 2Y charged by the charging section 23 (see FIG. 1) to form an electrostatic latent image on the surface 200.

In FIG. 3, the line head 29 is provided with a case 420 having a longitudinal direction identical to the main-scanning direction XX, and on each end of the case 420 there are provided a positioning pin 421 and a screw hole 422. By fitting the positioning pins 421 into positioning holes provided to a photoconductor cover (not shown), the line head 29 is positioned with respect to the photoconductor 2Y shown in FIG. 4. The photoconductor cover covers the photoconductor 2Y, and at the same time, is positioned with respect to the photoconductor 2Y. Further, setscrews are screwed in and fixed to the screw holes (not shown) of the photoconductor cover via the screw holes 422, thereby positioning and fixing the line head 29 to the photoconductor 2Y.

Figure 4:
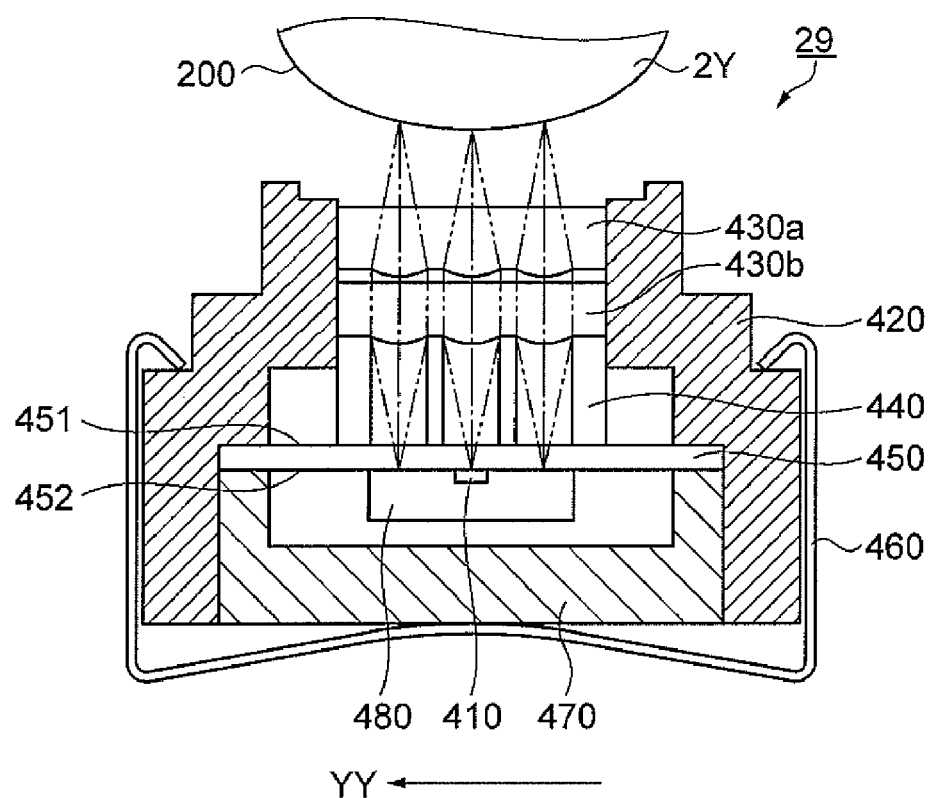
FIG. 4 is a cross-sectional view of the line head cut along a sub-scanning direction.

In FIGS. 3 and 4, the case 420 holds two lens arrays 430a, 430b each provided with lenses arranged therein so as to overlap with each other at a position opposed to the surface 200 of the photoconductor 2Y, and is provided with a light shielding member 440 and a head substrate 450 inside thereof near to the lens arrays 430a, 430b in this order.

The head substrate 450 is a transparent glass substrate. On a reverse surface 452 (one of two surfaces the head substrate 450 has, opposite to a front surface 451 opposed to the light shielding member 440), there are disposed the plurality of light emitting element groups 410. The light emitting element groups 410 are arranged two-dimensionally on the reverse surface 452 of the head substrate 450 with predetermined intervals therebetween in the main-scanning direction XX and a second direction substantially perpendicular to the main-scanning direction XX as shown in FIG. 3. Here, each of the light emitting element groups 410 is composed of the plurality of light emitting elements 411 arranged two-dimensionally as shown in a part surrounded by a circle shown in FIG. 3.

In the present embodiment, organic EL is used as the light emitting element. In other words, in the present embodiment, organic EL elements are arranged as the light emitting elements 411 on the reverse surface 452 of the head substrate 450. Further, a light beam emitted from each of the light emitting elements 411 towards the photoconductor 2Y proceeds towards the light shielding member 440 through the glass substrate 450.

It should be noted that the light emitting elements can be LED. In this case, the substrate is not required to be the glass substrate, and the LED can be disposed on the front side 451.

In FIGS. 3 and 4, the light shielding member 440 is provided with a plurality of light guide holes 4410 corresponding one-to-one to the light emitting element groups 410.

Further, the light beams emitted from the light emitting elements 411 belonging to the light emitting element groups 410 are guided to the pair of lens arrays 430a, 430b by the light guide-holes 4410 corresponding one-to-one to the light emitting element groups 410. Further, the light beams passing through the light guide holes 4410 should be imaged as spots on the surface 200 of the photoconductor 2Y by the lens arrays 430a, 430b as illustrated with chain double-dashed lines in FIG. 4.

Further, a back lid 470 shown in FIG. 4 is pressed against the case 420 by a retainer 460 via the head substrate 450. The retainer 460 has elastic force for pressing the back lid 470 towards the side of the case 420, and seals the case so that light does not leak from the inside of the case and that light does not enter from the outside of the case by pressing the back lid 470 with the elastic force. It should be noted that the retainer 460 is disposed in each of a plurality of positions along the main-scanning direction XX of the case 420. Further, the light emitting element groups 410 are covered by a seal member 480 shown in FIG. 4.

Figure 5:
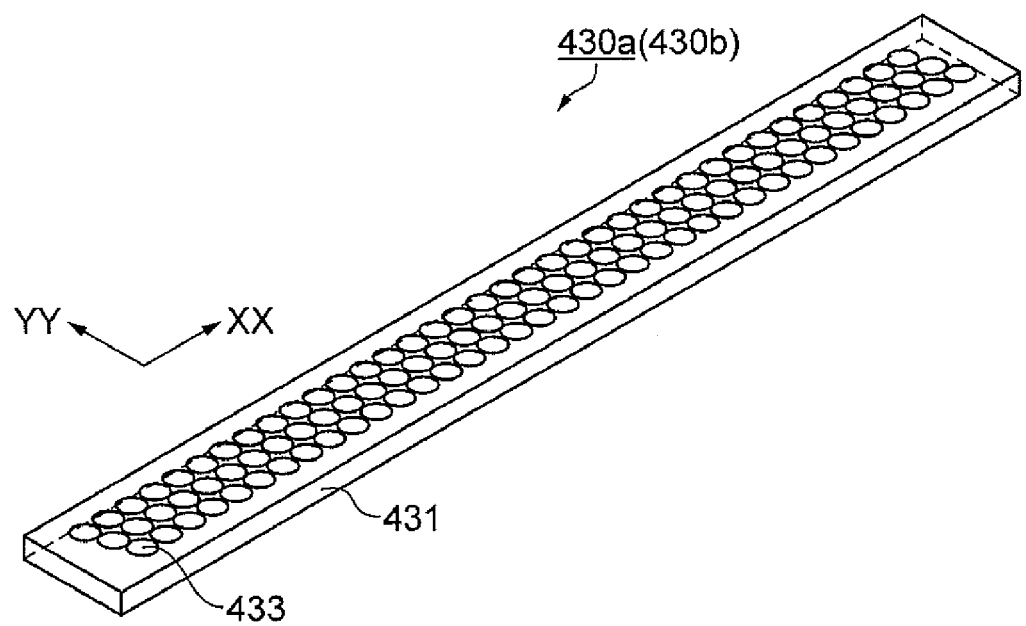
FIG. 5 is a schematic perspective view of the lens array.

FIG. 5 is a schematic perspective view of the lens array 430a (430b). It should be noted that the lens arrays 430a, 430b have the same configuration.

As shown in FIG. 5, the lens array 430a (430b) is provided with a plurality of lenses 433 arranged on a translucent lens array substrate 431 two-dimensionally in the main-scanning direction XX as a longitudinal direction thereof, and the second direction substantially perpendicular to the main-scanning direction XX. In the present embodiment, the lenses 433 are arranged with predetermined intervals therebetween, and assuming the lenses arranged in the longitudinal direction as a lens raw, three lens rows are disposed shifted from each other in the longitudinal direction.

It should be noted that the type of the arrangement of the lenses 433 on the lens array substrate 431 is not limited thereto, but the lenses 433 can be connected to each other without intervals, or the number of lens rows can be other than three.

In FIG. 4, the lens arrays 430a, 430b are arranged so that the lenses 433 shown in FIG. 5 face the head substrate 450. Therefore, the surface opposite to the surface provided with the lenses 433 is disposed at a position opposed to the photoconductor 2Y. Further, the lenses 433 in the lens array 430a and the lenses 433 in the lens array 430b form pairs, and have the optical axes illustrated with dashed lines in common, respectively. Further, the lens pairs 433 are disposed so as to correspond one-to-one to the light emitting element groups 410. The light beam emitted from each of the light emitting elements 411 (see FIG. 3) is imaged on the surface 200 of the photoconductor 2Y by the lens 433 as illustrated with chain double-dashed lines.

Then, a method of manufacturing the lens array 430a (430b) will be described.

Figure 6:
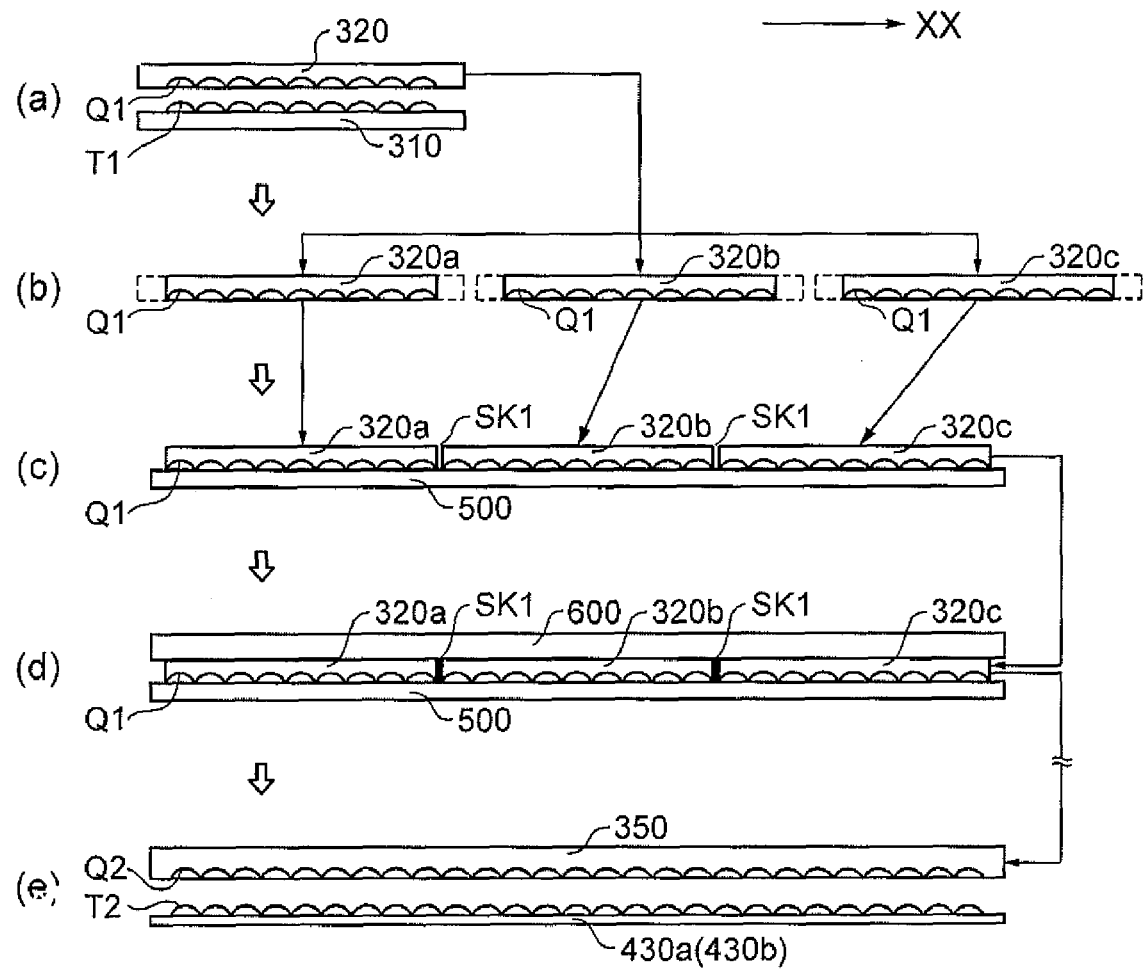
FIG. 6 is a cross-sectional diagram for explaining a method of manufacturing the lens array.

FIG. 6 is a cross-sectional diagram for explaining the method of manufacturing the lens array 430a (430b).

In the process shown in part A of FIG. 6, a metal mold 320 having concave surfaces Q1 is formed by electrocasting based on a metal mold 310. In the present embodiment, three metal molds 320a, 320b, 320c are formed based on the metal mold 310. Here, the metal mold 310 is obtained by forming a mold having convex surfaces T1 by electrocasting based on a master obtained by providing concave surfaces to a master made of a material such as iron, stainless steel, copper, or nickel by a free-form surface machine or the like.

In the process shown in part B of FIG. 6, the peripheral portions of each of the metal molds 320a, 320b, 320c illustrated with broken lines are cut off using wire-electrical discharge. It should be noted here that it is possible to cut off the both ends instead of the peripheral portion.

Figure 7A:
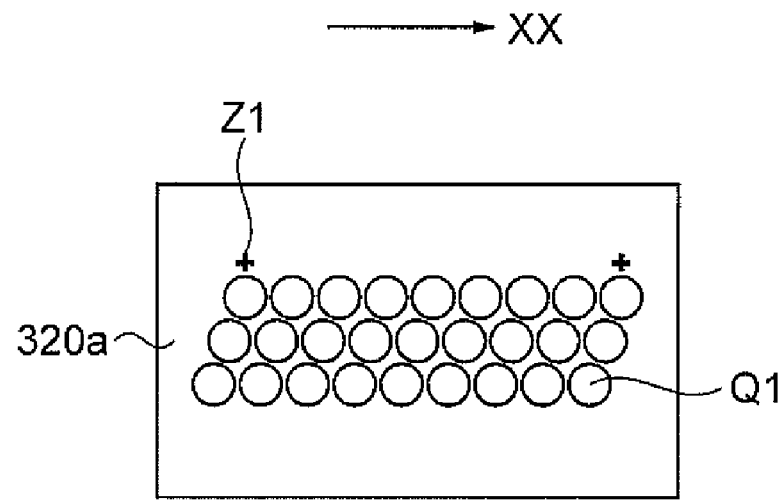
FIG. 7 is a diagram showing cutting-off of a peripheral portion of a metal mold.
Figure 7B:
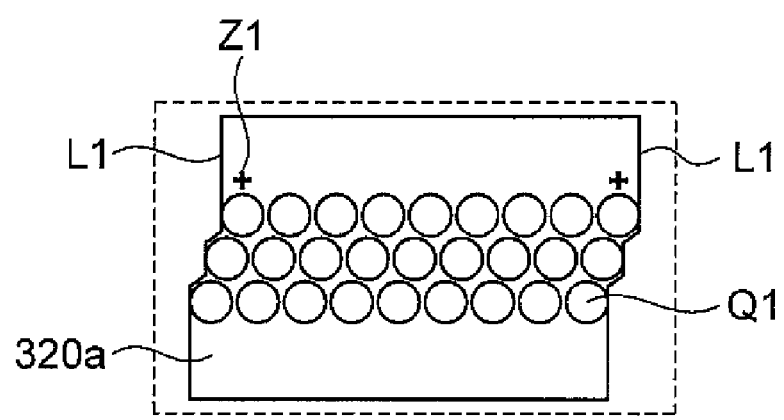

FIG. 7 is a diagram showing cutting-off of the peripheral portion of the metal mold 320a, wherein part A shows the metal mold 320a before cutting-off, and part B shows the metal mold 320a after cutting-off. As shown in the part B of FIG. 7, the entire peripheral portion of the metal mold 320a is cut off, and the both ends thereof in the main-scanning direction XX are cut off so that a cutting line L1 is perpendicular to or substantially perpendicular to the main-scanning direction XX. On this occasion, the cutting-off is executed in a zigzag manner so as to prevent the cutting line L1 from significantly overlapping concave surfaces Q1, which causes a part of the outer periphery of the surface Q1 to be cut off. It should be noted that the part thus cut off will be described later.

Alignment marks Z1 in the parts A, B of FIG. 7 are used for alignment between the metal mold 320a and the glass substrate 500 in the process shown in part C of FIG. 6.

It should be noted that the cutting-off of the metal mold 320a can similarly be applied to the metal molds 320b, 320c.

In the process shown in the part C of FIG. 6, the metal molds 320a, 320b, and 320c after the cutting-off are arranged on the glass substrate 500. In this case, the metal molds 320a, 320b, and 320c are arranged so that the concave surface Q1 side of each of the metal molds 320a, 320b, and 320c faces the glass substrate 500. It should be noted that prior to arranging the metal molds 320a, 320b, and 320c, the concave surface Q1 side of each of the metal molds 320a, 320b, and 320c is previously coated with an adhesive, which loses the adhesion by irradiation of an ultraviolet ray.

Subsequently, after arranging the metal molds 320a, 320b, and 320c, gaps SK1 between the metal molds 320a, 320b, and 320c are filled with ultraviolet curing resin, which cures in response to irradiation of an ultraviolet ray.

In a process shown in part D of FIG. 6, an adhesive is applied to a surface of each of the metal molds 320a, 320b, and 320c opposite to the concave surface Q1 side, and a substrate 600 made of stainless steel or the like is bonded thereon. Then, the ultraviolet ray is applied from the glass substrate 500 side, and then the glass substrate 500 is detached from the metal molds 320a, 320b, and 320c.

Subsequently, a metal mold 350 having concave surfaces Q2 is made by performing electrocasting two times from the metal molds 320a, 320b, and 320c fixed to the substrate 600 and integrated with the resin filling the gaps SK1. It should be noted that the process of forming the metal mold 350 is omitted from the cross-sectional view in FIG. 6.

In a process shown in part E of FIG. 6, the lens array 430a (430b) having convex surfaces T2 is manufactured by injection molding based on the metal mold 350 having the concave surfaces Q2.

Figure 8:
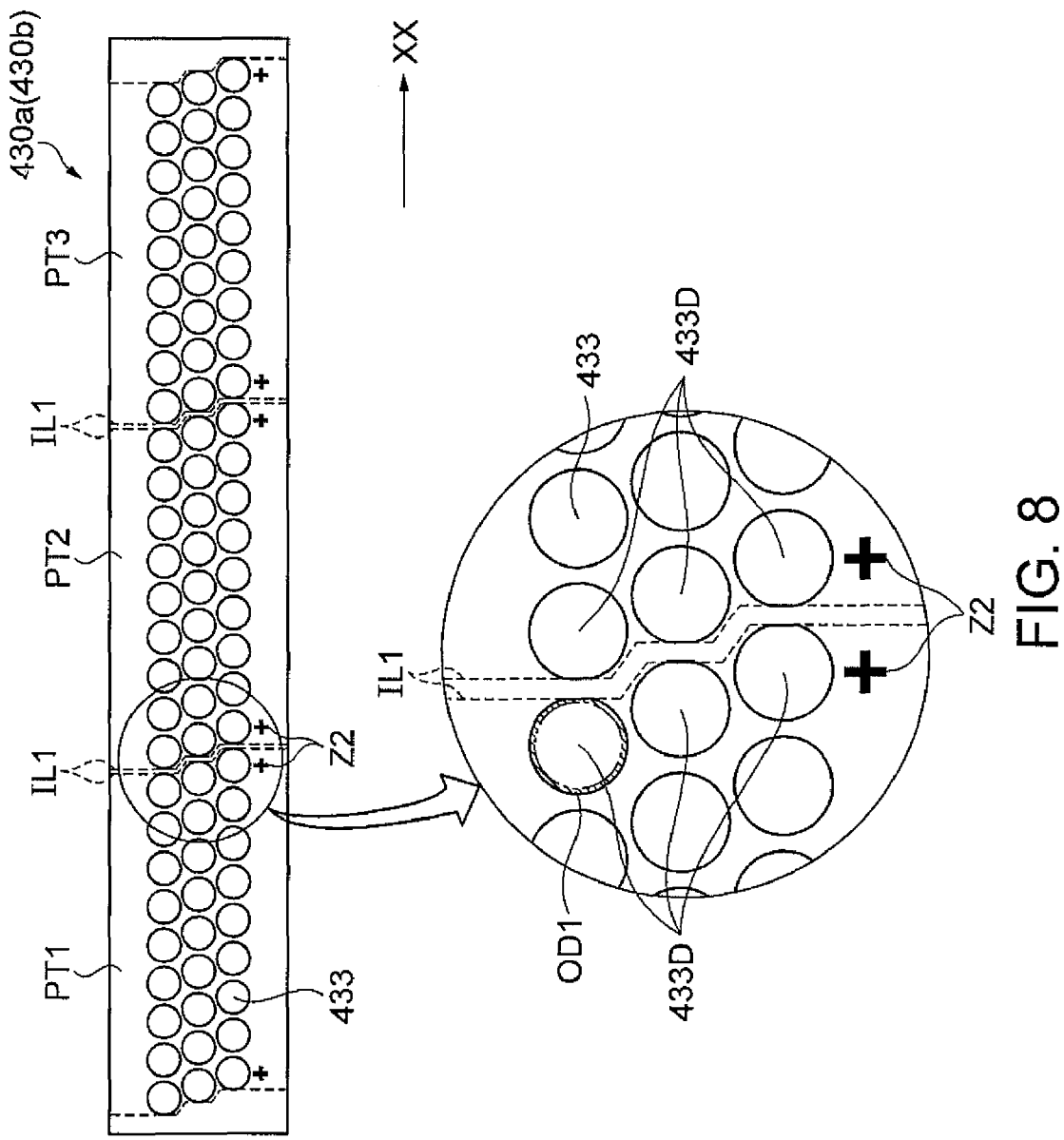
FIG. 8 is a diagram showing the lens array thus formed.

FIG. 8 is a diagram showing the lens array 430a (430b) formed by the manufacturing method described above.

In FIG. 8, the lens array 430a (430b) has the plurality of lenses 433 arranged two-dimensionally so as to be aligned in the main-scanning direction XX as the longitudinal direction. Further, here, the lens array 430a (430b) is sectioned into three areas PT1, PT2, and PT3. These areas PT1, PT2, and PT3 correspond respectively to areas of the metal molds 320a, 320b, and 320c in the processes shown in the parts B through D of FIG. 6. The positions of ideal lines IL1 shown in FIG. 8 correspond to the positions of the gaps SK1 between the metal molds 320a, 320b, and 320c in the processes shown in the parts C and D of FIG. 6.

In each of the areas PT1, PT2, and PT3, alignment marks Z2 formed by transferring the alignment marks Z1 shown in FIG. 7 are provided in two positions. These alignment marks Z2 are used for positioning when mounting the lens array 430a (430b) on the line head 29.

As shown in the enlarged diagram of a part surrounded by a circle shown in FIG. 8, the two ideal lines IL1 correspond respectively to the cutting line L1 shown in the part B of FIG. 7 in the process shown in the part B of FIG. 6, and have a zigzag shape. By the cutting-off along the cutting line L1, the outer peripheral area of some of the surfaces Q1 of the metal molds 320a, 320b, and 320c should be cut off. In the enlarged view of FIG. 8, six lenses 433D along the two ideal lines IL1 correspond to the lenses formed based on the surfaces Q1 after the cutting-off. These lenses 433D are formed by the cutting-off to have a D-cut peripheral shape different from that of the rest of the lenses. Here, the lenses 433D each have an area OD1 outside an effective range (outside the effective diameter), and it is arranged that the D-cut shape is formed in the area OD1 outside the effective range. Thus, it is possible to prevent the D-cut shape from affecting the optical characteristic of each of the lenses 433D.

Among the plurality of lenses 433 arranged side-by-side in the longitudinal direction in the lens array 430a (430b), the lenses 433D with the D-cut shape should represent the ideal lines IL1 between the PT1, PT2, and PT3. In other words, it becomes possible to identify the three areas of the PT1, PT2, and PT3 by the lenses 433D with the D-cut shape. It should be noted that among the plurality of lenses 433, the lenses 433D with the D-cut shape correspond to second lenses, and the rest corresponds to first lenses.

According to the present embodiment described above, the position of each of the lenses 433 arranged two-dimensionally in the lens array 430a (430b) can be indicated using the lenses 433D with the D-cut shape as indexes.

For example, when performing an appearance inspection for checking whether or not each of the lenses 433 thus formed has any blot or blemish in the manufacturing process of the lens array 430a (430b), the lenses 433D with the P-cut shape can be used. Specifically, in the case in which a defective lens is detected in the appearance inspection, it is preferable to count the number of lenses 433 from the nearest lens 433D with the D-cut shape in order for identifying the position thereof in the arrangement instead of counting it from the end of the lens array 430a (430b). Thus, the position of the defective lens in the arrangement can be identified accurately and in a short period of time.

Further, based on the lenses 433D with the D-cut shape, it is possible to identify which one of the metal molds 320a, 320b, and 320c in the processes shown in the parts B through D of FIG. 6 corresponds to the defective lens, and further, it is also possible to identify the position of the defective lens in the metal mold. Further, regarding the master provided with the concave surfaces formed by the free-form surface machine or the like and the metal mold 310 in the process shown in the part A of FIG. 6, the position of the defective lens in the master and the metal mold can also be identified. Thus, examinations of the master and the metal mold for determining the cause of the defective lens can be performed in a short period of time.

Further, in the case of extracting some lenses 433 as the inspection object instead of all of the lenses 433 arranged in the lens array 430a (430b), it is possible to select either one of the areas PT1, PT2, and PT3 as the inspection object. Thus, at least the quality of the master provided with the concave surfaces formed by the free-form surface machine or the like and the metal mold 310 can be inspected without omission, and the inspection can be executed efficiently and with high accuracy.

It should be noted that the invention is not limited to the present embodiment, but can variously be modified besides the embodiment described above within the scope of the invention.

MODIFIED EXAMPLES

Figure 9:
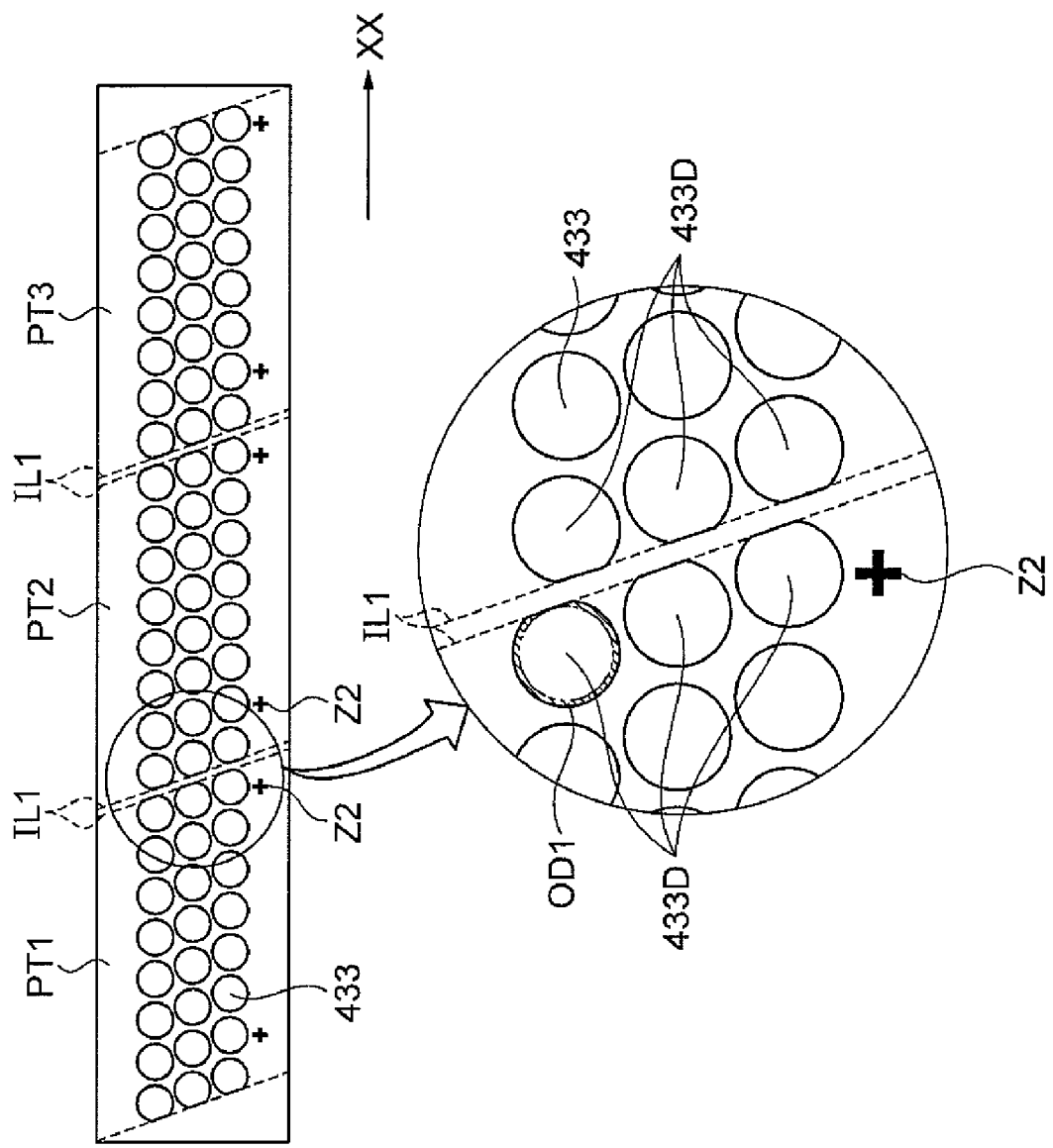
FIG. 9 is a diagram showing a modified example of the lens array thus formed.

Although in the present embodiment the ideal lines IL1 corresponding to the cutting lines L1 shown in the part B of FIG. 7 have a zigzag shape as shown in FIG. 8, this is not the limitation. For example, it is also possible to form each of the ideal lines IL1 to have a straight shape by adopting the cutting lines L1 with a straight shape instead of the cutting lines L1 with the zigzag shape as shown in FIG. 9. On this occasion, it is necessary to form the D-cut shapes, which is formed by the straight cutting lines L1, in the areas OD1 outside the effective diameters of the respective lenses 433D. Further, each of the ideal lines IL1 is not limited to the line with the zigzag shape or the straight shape, but can be a line with other shapes.

Further, although in the present embodiment, the invention is applied to the color image forming apparatus, the application object is not limited thereto, but the invention can also be applied to the monochrome image forming apparatus for forming a so-called monochrome image.

Further, the invention can also be applied to an image forming apparatus using a liquid toner having the toner particles dispersed in a nonvolatile liquid carrier, besides the image forming apparatus using a dry toner.

The entire disclosure of Japanese Patent Applications No. 2008-210359, filed on Aug. 19, 2008 is expressly incorporated by reference herein.

What is claimed is:

1. A line head comprising:
   a lens array comprising:
      a lens array substrate having a light transmissive property;
      a first lens disposed on the lens array substrate; and
      a second lens disposed on the lens array substrate in a first direction from the first lens and different from the first lens in peripheral shape, and
   a head substrate having a plurality of light emitting elements arranged and adapted to emit light to be imaged by the lenses.

2. The line head according to claim 1, wherein a plurality of lenses including the first lens and the second lens is disposed two-dimensionally in the first direction and a second direction that is substantially perpendicular to the first direction.

3. The line head according to claim 1, wherein a part in which the peripheral shape of the second lens is different from the peripheral shape of the first lens is formed in an area outside an effective range of the second lens.

4. The line head according to claim 1, wherein the peripheral shape of the second lens is a D-cut shape.

5. An image forming apparatus comprising:
   at least two image forming stations each of which has a charging unit, a line head, a developing unit, and a transfer unit disposed around an image carrier, wherein
   the line head comprises:
      a lens array comprising:
         a lens array substrate having a light transmissive property;
         a first lens disposed on the lens array substrate; and
         a second lens disposed on the lens array substrate in a first direction from the first lens and different from the first lens in peripheral shape, and
      a head substrate having a plurality of light emitting elements arranged and adapted to emit light to be imaged by the lenses, and
   tandem-type image formation is performed by causing a transfer medium to pass through each station.

6. An image forming apparatus comprising:
   an image carrier on which is formed a latent image;
   a charging unit that charges the image carrier;
   a line head that forms the latent image on the image carrier and comprises:
      a lens array comprising:
         a lens array substrate having a light transmissive property;
         a first lens disposed on the lens array substrate; and
         a second lens disposed on the lens array substrate in a first direction from the first lens and different from the first lens in peripheral shape, and
      a head substrate having a plurality of light emitting elements arranged and adapted to emit light to be imaged by the lenses;
   a developing unit that develops the latent image; and
   a transfer unit that transfers an image developed by the developing unit onto a transfer medium.

* * * * *